Sept. 23, 1969  J. R. MARTINET ET AL  3,468,526
COPPER CONVERTER HAVING TAR IMPREGNATED FIRED
CHROMITE BRICK LINING
Filed Oct. 25, 1965  2 Sheets-Sheet 1
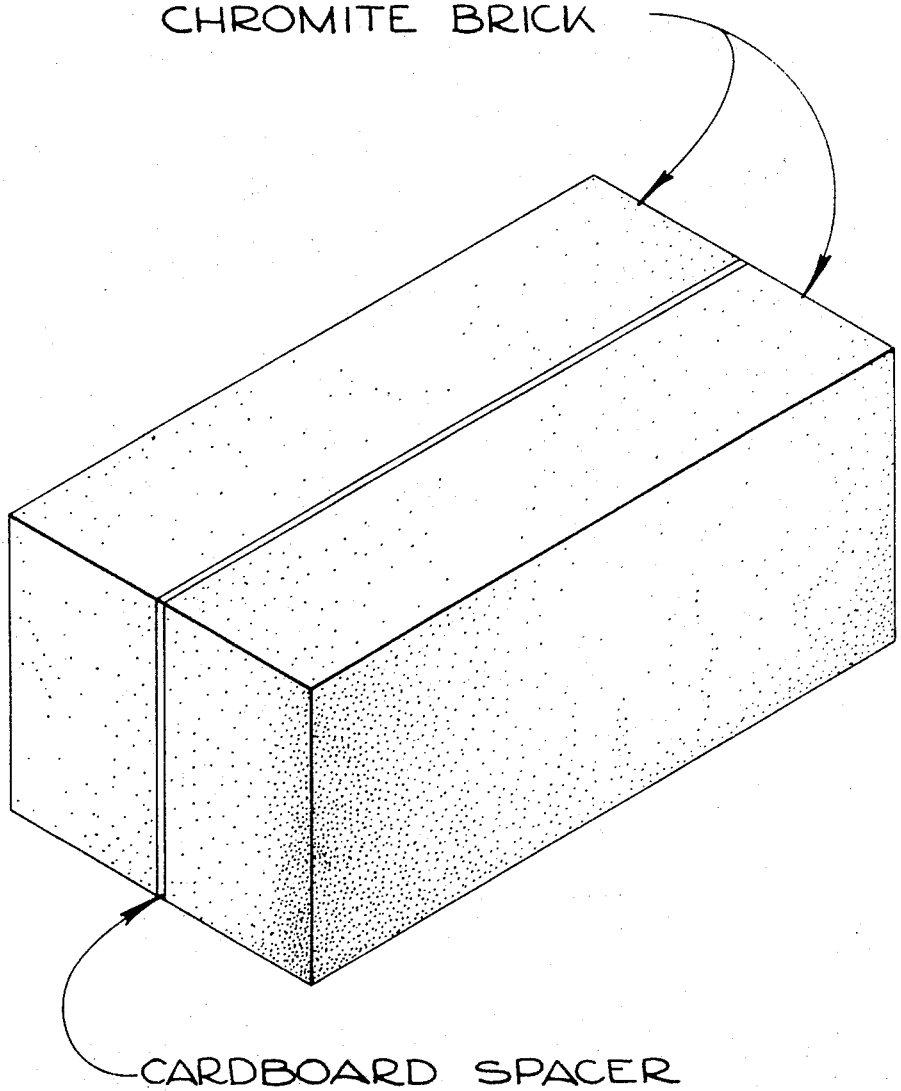
TAR-IMPREGNATED FIRED
CHROMITE BRICK
CARDBOARD SPACER
FIG_1
INVENTOR
JACQUES R. MARTINET
JAN BOWMAN
BY
*Katherine Loup*
AGENT

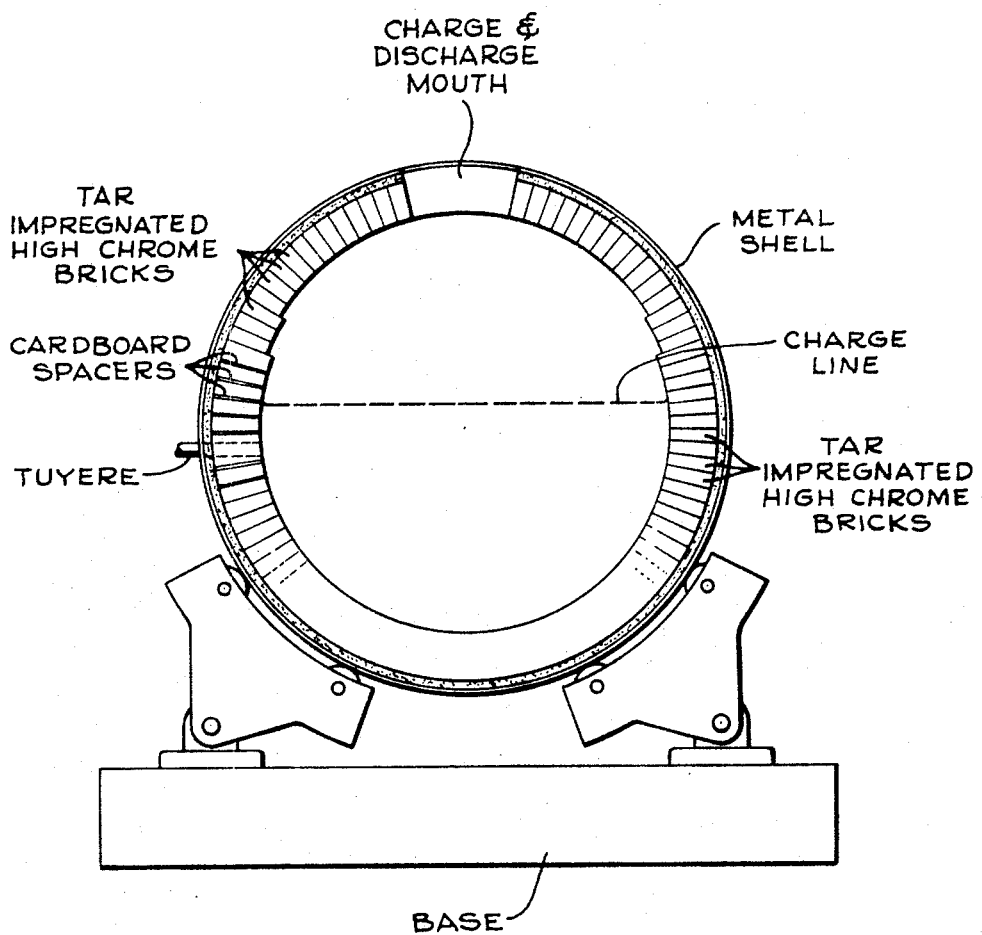
FIG_2

United States Patent Office 3,468,526
Patented Sept. 23, 1969

3,468,526
COPPER CONVERTER HAVING TAR IMPREGNATED FIRED CHROMITE BRICK LINING
Jacques R. Martinet, San Jose, and Jan Bowman, Los Gatos, Calif., assignors to Kaiser Aluminum & Chemical Corporation, Oakland, Calif., a corporation of Delaware
Filed Oct. 25, 1965, Ser. No. 505,187
Int. Cl. F27b 1/14; C04b 35/42
U.S. Cl. 266—43                                                6 Claims

ABSTRACT OF THE DISCLOSURE

A copper converter is provided having a refractory lining containing fired, shaped articles containing at least 40% by weight of chromite and impregnated, after firing, with a cokable carbonaceous material; and in the installed lining cardboard spacers are provided between at least some of the shapes.

---

This invention concerns copper converters and refractory linings therefor.

Although copper converters have been in use for many years, the refractories industry continues to conduct a search for lining materials which will last for a greater length of time or a larger number of heats. Particularly, there has been sought a refractory lining which will resist attack by metallic copper and by sulfides and slags through penetration and subsequent freezing and thawing.

It has now been found, according to this invention, that a superior refractory lining for a copper converter can be made from basic refractory shapes containing at least 40% chromite, such shapes having been fired, preferably to a temperature, for example, above about 1650° C., at which direct bonding occurs between the chromite grains themselves or between chromite grains and other refractory grains in the composition, and having been impregnated with a cokable carbonaceous material, for example, tar or pitch.

The chromite used in the practice of this invention can be any of the various types of chromite found in various parts of the world and well known in the art as refractory materials. It can also be reconstituted chrome ore or prereacted chrome in the form of spinel grains. The other refractory grains used are preferably periclase containing a high percentage of MgO, for example, at least 85% by weight, since such material exhibits, after firing at a sufficiently high temperature, direct bonding with the chromite. However, other basic refractory grains, for example, spinel grains formed by reacting periclase and chromite, can be used.

The shapes according to this invention can be formed by any conventional means, for example by pressing in a die at pressures of up to 10 tons per square inch, or by forming in a die at lower pressures accompanied by vibration.

Preferably, the firing of these refractory shapes is carried out at such a temperature that there is formed a direct bond between the chromite and periclase grain in the refractory, as is well known in the art. In other words, the firing is carried out at such a temperature that the silicate materials contained in the refractory are segregated in discrete and discontinuous pockets. However, conventionally fired refractories; e.g., brick fired at 1350° C., can also be used in the practice of this invention.

The impregnation of the refractories according to this invention is carried out after their firing and can be done by any means known in the art, for example, by subjecting the refractory to vacuum, then immersing it in molten tar or pitch and finally subjecting the tar or pitch surrounding the refractory to elevated pressures.

The tar or pitch used to impregnate the refractories of this invention can be any such material. Generally, it will be preferred to use a tar or pitch of relatively higher softening point, for example, a softening point about 80° C., since such higher softening point pitches are known to yield a higher residue when coked and such higher carbon residue in the refractory is advantageous.

It is an advantage of refractory linings according to this invention that they show longer life and less erosion when used in a copper converter than prior art refractory linings.

Another advantage of refractories according to this invention is that when, as is a common practice in the industry, cardboard spacers to provide thermal expansion allowance are placed between the refractory shapes lining a copper converter, the tar impregnated refractories prevent metal penetration and consequent erosion at the joints. It is believed that upon heating up of the furnace, the tar melts and penetrates the cardboard and that, upon further heating, the tar-impregnated cardboard cokes, forming a filling for the joint which is not wet, and therefore, not penetrated, by molten metal and slag. In the ordinary, non-tar-containing construction with cardboard, on the other hand, the cardboard burns out, leaving an opening into which slag and metal can penetrate and cause erosion and wear.

FIGURE 1 shows a typical arrangement of adjacent bricks separated by such cardboard spacer. FIGURE 2 shows a schematic end view of a conventional copper converter, with end wall removed, but showing the inclusion of a lining having tar impregnated high-chrome bricks and, adjacent the tuyere line, such bricks having cardboard spacers therebetween, as further described hereinbelow.

Example I

As an example of the practice of this invention, a composition consisting of 87 parts by weight chromite and 13 parts by weight periclase was mixed with 6% water and 1% $CrO_3$, (chromic acid) as a room temperature binder and formed into shapes by pressing at a pressure of 10,000 p.s.i. The chromite used had the following typical chemical analysis: 21.6% MgO, 0.8% CaO, 5.5% $SiO_2$, 27.9% $Al_2O_3$, 14.3% $Fe_2O_3$, and 29.9% $Cr_2O_3$. The periclase used had the following typical chemical analysis: 1.1% CaO, 2.1% $SiO_2$, 0.3% $Al_2O_3$, 0.4% $Fe_2O_3$, 0.3% $Cr_2O_3$, and 95.8% MgO (by difference). The formed shapes were fired at a temperature of 1350° C. and subsequently impregnated with pitch having a softening point of 82° C. by heating the brick to 400° C. and immersing them in the pitch for 45 minutes, the pitch being maintained at a temperature of 130° C.

The shapes made as described above were placed in a 13 ft. diameter copper converter where they formed that part of the lining comprising the tuyere line area, that is to say, from 1 foot below to 3 feet above the tuyeres. These tar impregnated tuyere area brick lasted for a campaign producing 20,000 tons of copper without major spalling. Using conventional, non-tar impregnated refractories, major spalling almost invariably occurs.

Example II

Other refractories, made from the chromite and periclase used in Example I, but in proportions to yield an overall content of 40% MgO and impregnated with molten pitch under pressure, were installed in another copper converter. After 7 weeks of a campaign during which 9000 tons of copper were produced, these brick showed only 3″ erosion. In prior experience with non-tar impregnated brick in the same converter, erosion of 9″ of refractory had occurred at the equivalent point in the campaign.

Having now described the invention, what is claimed is:

1. A copper converter having a refractory lining consisting essentially of basic refractory shapes, said shapes containing at least 40% by weight chromite and being fired and thereafter impregnated with a cokable carbonaceous material.

2. A lining according to claim 1 wherein said shapes have been fired to a temperature of at least 1650° C.

3. A lining according to claim 1 wherein said cokable carbonaceous material is pitch.

4. A lining according to claim 3 wherein said pitch has a softening point of at least 80° C.

5. A lining according to claim 1 wherein said chromite is chrome ore.

6. A lining according to claim 1 wherein cardboard thermal expansion spacers are placed between at least some of said shapes.

References Cited

UNITED STATES PATENTS

| | | | |
|---|---|---|---|
| 2,791,116 | 5/1957 | Heuer et al. | 266—43 |
| 3,141,785 | 7/1964 | Davies | 106—59 |
| 3,148,238 | 9/1964 | Willenbrock | 266—43 |
| 3,256,104 | 6/1966 | Weaver | 106—66 X |
| 3,258,257 | 6/1966 | Wilson et al. | 266—43 X |
| 3,312,457 | 4/1967 | Schweinsberg et al. | 106—59 X |

FOREIGN PATENTS

| | | |
|---|---|---|
| 37/9,699 | 1962 | Japan. |
| 46,418 | 11/1962 | Poland. |

J. SPENCER OVERHOLSER, Primary Examiner

R. SPENCER ANNEAR, Assistant Examiner

U.S. Cl. X.R.

106—59; 264—62